D. D. GETMAN.
FLAT TIRE SIGNAL.
APPLICATION FILED MAR. 3, 1917.

1,228,204.

Patented May 29, 1917.

WITNESSES:
B. Hall
E. A. Paul

INVENTOR:
DAVID D. GETMAN
BY
Paul & Paul
ATTORNEYS.

UNITED STATES PATENT OFFICE.

DAVID D. GETMAN, OF MINNEAPOLIS, MINNESOTA, ASSIGNOR OF ONE-THIRD TO JOSEPH P. STERNHAGEN, OF GLASGOW, MONTANA.

FLAT-TIRE SIGNAL.

1,228,204.   Specification of Letters Patent.   Patented May 29, 1917.

Application filed March 3, 1917. Serial No. 152,263.

*To all whom it may concern:*

Be it known that I, DAVID D. GETMAN, a citizen of the United States, resident of Minneapolis, county of Hennepin, State of Minnesota, have invented certain new and useful Improvements in Flat-Tire Signals, of which the following is a specification.

In the operation of a vehicle equipped with pneumatic tires, one or more of them often becomes punctured and the driver of the car may run it for a considerable distance, sufficient to seriously damage the tire or the rim, before discovering that a puncture has occurred.

The object of my invention is to provide an attachment for the tire which will instantly warn the driver as soon as the air has escaped from the inner tube.

The invention consists generally in various constructions and combinations, all as hereinafter described and particularly pointed out in the claims.

Figure 1:
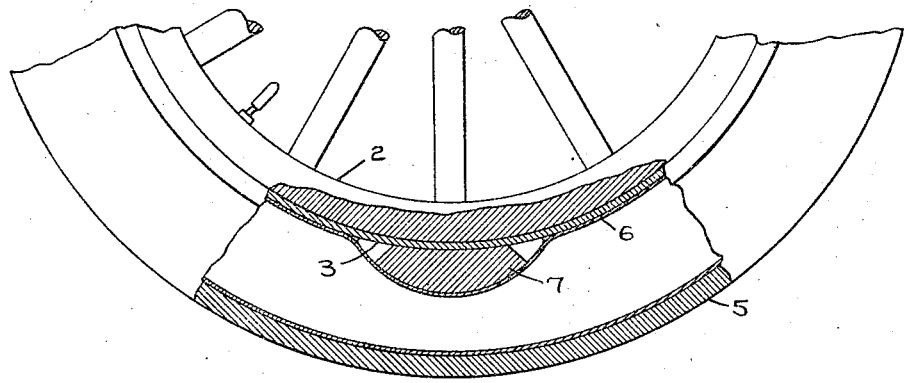
Figure 2:
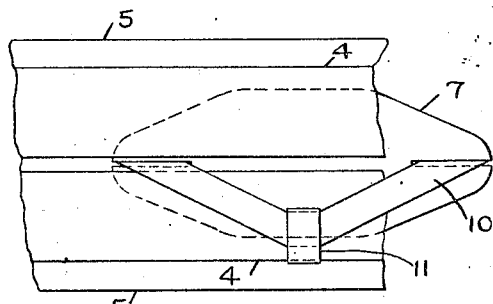
Figure 5:
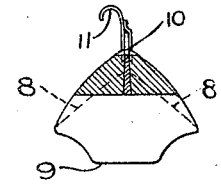
Figure 3:
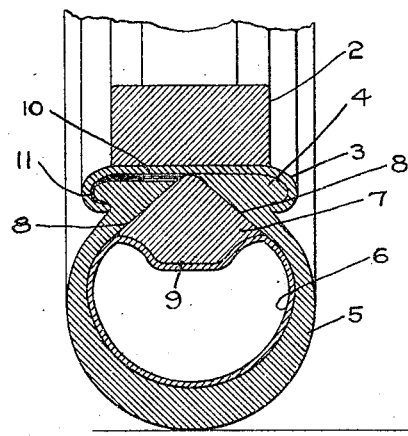
Figure 4:
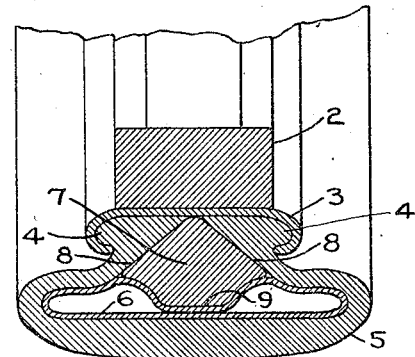

In the accompanying drawings forming part of this specification,

Figure 1 is a view, partially in section, of a wheel equipped with a pneumatic tire, with my attachment applied thereto, Fig. 2 is a plan sectional view, showing the manner of fastening the attachment to the casing, Fig. 3 is a transverse sectional view, with the tube inflated, Fig. 4 is a similar view, with the tube deflated, Fig. 5 is a detail view of the attachment removed from the tire.

In the drawing, 2 represents a wheel rim, having the usual flanges 3 for engaging the lips 4 of the tire casing 5. 6 is the inner tube. When this tube becomes punctured, the wheel will drop and unless the accident is quickly repaired, serious damage will result to the outer casing and inner tube, as well as the wheel.

As a means for warning the driver when a puncture occurs, I provide a block 7, preferably provided with inner surfaces 8, which fit the inner walls of the casing and with an outer surface 9 that is seated against the inner tube. This block may be made of any suitable material and varied in size and shape, according to the style of the casing with which it is used. A strip 10 of flexible material is preferably seated within said block and projects outwardly therefrom, and a hook device 11 is mounted thereon for engaging a lip 4 of the casing for holding the block in place while the tube is being inflated. When the tube has been inflated to the desired pressure its walls, bearing on the outer face of the block, will hold it firmly against the walls of the casing and prevent it from slipping out of place while the tire is in use. In case of puncture and deflation of the tube, the tread of the casing will flatten out and the collapsing of the tube will allow the load of the vehicle to be transmitted directly from the tread of the casing upon the block and with every revolution of the wheel a bumping or jarring movement will take place and the driver will be instantly warned that the tire has punctured and needs attention.

In various ways the details of construction herein shown and described may be modified and still be within the scope of my invention.

I claim as my invention:

1. In combination, with a pneumatic tire and means normally held by the inflated tube out of contact with the tire tread but allowed to press thereon at a point in the circumference of the tire when the tube is deflated, said means being mounted on the tire casing between it and the inner wall of the tube.

2. In combination, with a pneumatic tire, and means inserted between the inner wall of the tube and the flanges of the casing for bearing on the tread of the casing when the tube is deflated and producing a bumping or jarring with each turn of the wheel.

3. In combination, with a pneumatic tire, a block inserted between the inner wall of the tube and the flanges of the casing for bearing on the tread of the casing when the tube is deflated, for the purpose specified.

4. In combination, with a pneumatic tire, a block having surfaces for fitting the flanges of the casing and the surfaces of the tube and having means for connection with the tire casing, said block bearing on the tread of the casing when the tube is deflated.

In witness whereof, I have hereunto set my hand this 28th day of February, 1917.

DAVID D. GETMAN.